Patented Jan. 1, 1935

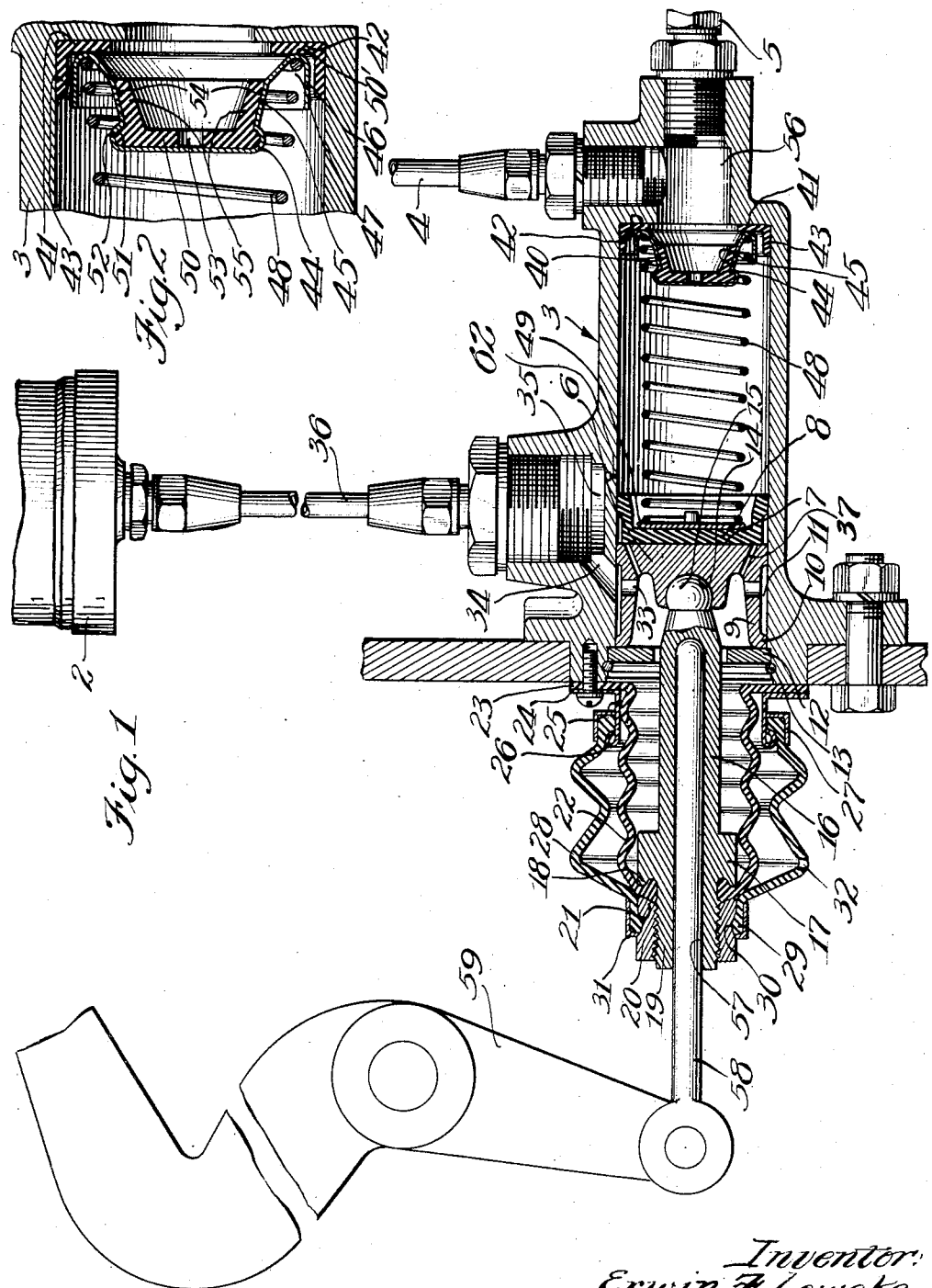

1,985,936

UNITED STATES PATENT OFFICE 1,985,936

VALVE FOR HYDRAULIC BRAKE SYSTEMS

Erwin F. Loweke, Detroit, Mich., assignor to Hydraulic Brake Company, Detroit, Mich., a corporation of California Application August 2, 1930, Serial No. 472,666

7 Claims. (Cl. 277—45)

My invention relates to hydraulic brake systems and more particularly to valves for the master cylinder of hydraulic brake systems.

In order to prevent air from entering the system at the wheel brake cylinders, it is desirable to maintain a higher than atmospheric pressure in the wheel brake cylinders and the fluid conduits leading thereto from the master cylinder. For this purpose a double acting valve is provided at the discharge end of the master cylinder, allowing the fluid to leave the cylinder freely but restraining its return to the cylinder to maintain a predetermined pressure in the wheel brake cylinders and fluid conduits.

An object of my invention is to provide a valve mechanism which is simple in construction and most positive in its operation.

Another object of my invention is to provide an improved valve mechanism of the above type.

A further object of my invention is to provide a double acting valve of the above type which comprises relatively few parts, facilitating the ready assembly of the same, and in which the parts are readily replaced.

The above objects, as well as others not particularly pointed out, will appear in the following description in reference with the accompanying drawing in which like reference characters in the several views denote like parts and in which Fig. 1 is a longitudinal section of a master cylinder assembly provided with the valve structure of my invention; and Fig. 2 is an enlarged fragmentary section of the valve structure.

The invention comprises in general a fluid reservoir 2 and a master cylinder 3, the outlet ports 4 and 5 leading to the wheel brake cylinders by conduits, as is well understood. The master cylinder 3 has a piston 6 reciprocably mounted therein and comprises a face portion 7 adapted to carry a packing cup 8 and a rearwardly extending flange 9 spaced from the wall of the master cylinder 3. The end of the rearwardly extending flange 9 has a radial flange 10 which contacts with the cylinder wall to guide the piston therein, forming an annular recess 11 around the piston.

A ring 12 is retained in the end of the cylinder 3 by a split spring ring 13 and is adapted to limit the rearward movemet of the piston 6. The piston is also provided with a socket 14 which engages a ball 15 of a plunger 16, by means of which the piston may be moved. The plunger 16 is provided at its opposite end with an annular ring 17 having an undercut shoulder 18. The end 19 of the plunger 16 is threaded and is adapted to receive a nut 20 having a similar undercut shoulder 21.

Shoulders 18 and 21 are adapted to engage the annular beaded end of a boot 22 of rubber or the like which surrounds the plunger 16. The front end of the boot 22 is formed into a flange 23 which is held against the master cylinder 3 by a ring 24. Ring 24 has a cylindrical portion 25 integral therewith and extending rearwardly, which is provided at its end with an annular bead 26.

A collar 27 serves to retain the enlarged annular end of a second boot 28 in firm engagement with the annular bead 26. The opposite end of the boot 28 is provided with an enlarged annular portion 29 which rests in a suitable groove 30 in the nut 20 and is secured therein by a collar 31. The boot 28 may be made of any suitable flexible material not affected by lubricating oils, and serves to protect the flexible boot 22 from oils and dust. The boot 28 is provided at its lower side with an aperture 32 connecting the interior of the boot 28 with the atmosphere.

The rearwardly extending flange 9 of the piston 6 is provided with an aperture 33, and the wall of the master cylinder 3 is provided with an aperture 34 leading into the chamber 35 which is in communication through a tube 36 with the fluid reservoir 2. Fluid from the reservoir passes through the tube 36, chamber 35, the aperture 34 into the annular recess 11 of the piston 6 and through the passage 33 in the piston 6 into the flexible boot 22, which forms a fluid chamber closing the rear side of the piston 6.

The face 7 of the piston 6 is provided with a plurality of ducts 37 which extend therethrough and communicate with the space in the cylinder 3 to the rear of the piston 6. During the forward movement of the piston 6 these ducts 37 are covered by the packing cup 8, causing fluid pressure to be produced in the master cylinder 3.

At the discharge end of the master cylinder 3 is a valve, indicated generally by the reference character 40, which cooperates with a flat ring-shaped valve seat member 41. The valve seat member 41 is made of suitable resilient material and rests against the end wall 42 of the master cylinder and is maintained in position by means of its axially extending flange 43 which firmly engages the wall of the master cylinder 3.

The valve 40 comprises an inverted rigid cup-shaped member 44 provided with diverging walls 45 and an integral exteriorly disposed apron projection 46 formed by means of a reverse bend to provide an annular recess 47 between the outer wall of the member 44 and the apron 46.

A spring 48 is interposed between the piston 6 and the valve 40, its one end resting against a washer 49 engaging the packing cup 8 and its other end resting in the annular recess 47 of the member 44 to urge the member 44 forward. The annular rim 50' formed by the reverse bend to provide the apron 46 is yieldingly retained in engagement with the member 41 to form a seat for the valve 40.

A resilient cup-shaped member 50 fitted within the member 44 is provided with an externally formed bead 51 at its base which rests in an annular recess 52, semicircular in cross-section, formed in the wall of the member 44 at its base. As the member 50 is made of resilient material, such as rubber, the member 50 may be temporarily deformed to permit the bead 51 to be forced past the restricted opening lying just forward of the recess 52 so the bead 51 may be made to enter the recess 52. The member 50, after the bead 51 has entered the recess 52, is again permitted to assume its original contour, allowing the bead 51 to completely fill the recess 52 to maintain the member 50 within the member 44 against displacement. A central orifice 53 in the bottom of the member 50 allows the escape of air as the bead enters the recess to assure a perfect contact between the respective faces of the members 44 and 50. The wall of the member 44 is provided with a plurality of apertures 54 which are normally closed by the wall of the resilient member 50.

As the piston 6 moves forwardly, producing a fluid pressure in the cylinder, fluid passes through the apertures 54 in the wall of the member 44, forcing the wall 55 of the member 50 away from the wall of the rigid valve member 44 and allowing the fluid to pass through the opening 56 in the end of the master cylinder 3 through conduits 4 and 5 to the wheel brake cylinders to apply the brakes, as is well understood.

The plunger 16 is provided with a cylindrical bore 57 into which a connecting rod 58, pivotally attached to the end of the brake pedal 59, projects. This type of connection, upon the depression of the pedal 59, produces a positive movement of the piston 6 in its pressure producing movement. Upon the release of the pedal 59 and its return to normal position, the piston 6 will not be positively withdrawn but instead, the connecting rod 58 will be withdrawn from the plunger 16. The retraction of the piston 6 is caused by the retractile spring 48 and during the retraction of the piston 6 the valve 40 in the end of the cylinder 3 will be yieldingly urged upon its seat 41 by the spring 48 to maintain a positive pressure in the wheel brake cylinders and the fluid conduits leading thereto. The fluid pressure from the wheel brake cylinders and fluid conduits will force the wall 55 of the resilient member 50 to again engage the interior wall of the rigid member 44, closing the apertures 54, and the valve 40, upon sufficient pressure, will be unseated to allow fluid to return to the cylinder.

The amount of positive pressure in the wheel brake cylinders will depend upon the relative sizes of the valve and the piston. As the rear side of the piston 6 is subjected to atmospheric pressure, the valve 40 may be made of such size as to maintain a pressure of six pounds above atmospheric pressure in the wheel brake cylinders and conduits.

Retraction of the piston 6 produces a low pressure in the master cylinder 3, causing the packing cup 8 to become unseated and allowing fluid from the rear side of the piston to pass through the passages 37 into the master cylinder.

When the piston 6 returns to its full retracted position there will be an excess of fluid in the master cylinder 3 due to the fact that fluid will continue to enter the cylinder 3 from the wheel brake cylinders after the piston 6 is retracted. The excess fluid which is present in the cylinder may escape through the passage 62 in the upper wall of the cylinder located immediately in front of the retracted position of the packing cup 8.

When equilibrium has been established in the master cylinder 3 the valve 40 is again seated against the valve seat 41.

What I claim as new and desire to secure by United States Letters Patent is:

1. A double acting valve mechanism including a valve seat, a cup-shaped rigid member having a base and an annular wall with spaced apertures therein, a cup-shaped resilient member located within said rigid member and having an annular wall normally closing said apertures, said apertures being adjacent the open end of said resilient member, means for retaining the resilient cup-shaped member within the rigid member, and means for forcing said rigid member against said seat.

2. A double acting valve mechanism including a valve seat, a cup-shaped rigid member having a base and an annular wall with spaced apertures therein, a cup-shaped resilient member located in said rigid member and having an annular wall normally closing said apertures, said apertures being adjacent the open end of said resilient member, said members being provided with interlocking beads for retaining the resilient cup-shaped member within the rigid member, and means for forcing said rigid member against said seat.

3. A double acting valve mechanism including a valve seat, a cup-shaped rigid member having an annular wall with spaced apertures therein, a cup-shaped resilient member located within said rigid member and having an annular wall normally closing said apertures, said apertures being adjacent the open end of said resilient member, said resilient member having a base provided with an aperture therein, means for retaining the resilient cup-shaped member within the rigid member, and means for forcing said rigid member against said seat.

4. A double acting valve mechanism including a valve seat, a cup-shaped rigid member having a base and a slightly tapered annular wall with spaced apertures therein, a cup-shaped resilient member located in said rigid member and having an annular wall normally closing said apertures, said apertures being adjacent the open end of said resilient member, means for retaining the resilient cup-shaped member within the rigid member, and means for forcing said rigid member against said seat.

5. A double acting valve mechanism including a valve seat, a cup-shaped rigid member having a base and an annular wall with spaced apertures therein, said member having an upturned apron, a spring engaging said apron for forcing said member against said seat, a cup-shaped resilient member located in said rigid member and having an annular wall normally closing said apertures, said apertures being adjacent the open end of said resilient member, and means for retaining the resilient cup-shaped member within the rigid member.

6. A double acting valve mechanism including a valve seat, a cup-shaped rigid member having a base and an annular wall with spaced apertures therein, said member being made of sheet metal and having a reversely bent portion providing an annular sealing surface for engagement with said valve seat, a cup-shaped resilient member located in said rigid member and having an annular wall normally closing said apertures, said apertures being adjacent the open end of said resilient member, means for retaining the resilient cup-shaped member within the rigid member, and means for forcing said rigid member against said seat.

7. A double acting valve mechanism including a valve seat, a cup-shaped rigid member having a base and a slightly tapered annular wall with spaced apertures therein, said member being made of sheet metal and having a reversely bent portion forming a spring seat and providing an annular sealing surface for engagement with said valve seat, a spring engaging said spring seat and tending to force said sealing surface against said valve seat, a rubber cup-shaped member located in said rigid member and having an annular wall normally closing said apertures, said apertures being adjacent the open end of said resilient member, said resilient member having a base provided with an aperture therein, and interlocking beads provided by said members for holding said resilient member within said rigid member.

ERWIN F. LOWEKE.